May 17, 1932. D. M. ANDERSON 1,859,065
JOINT FOR PIPES OR VESSELS FOR CONTAINING FLUID UNDER PRESSURE
Filed Sept. 5, 1931
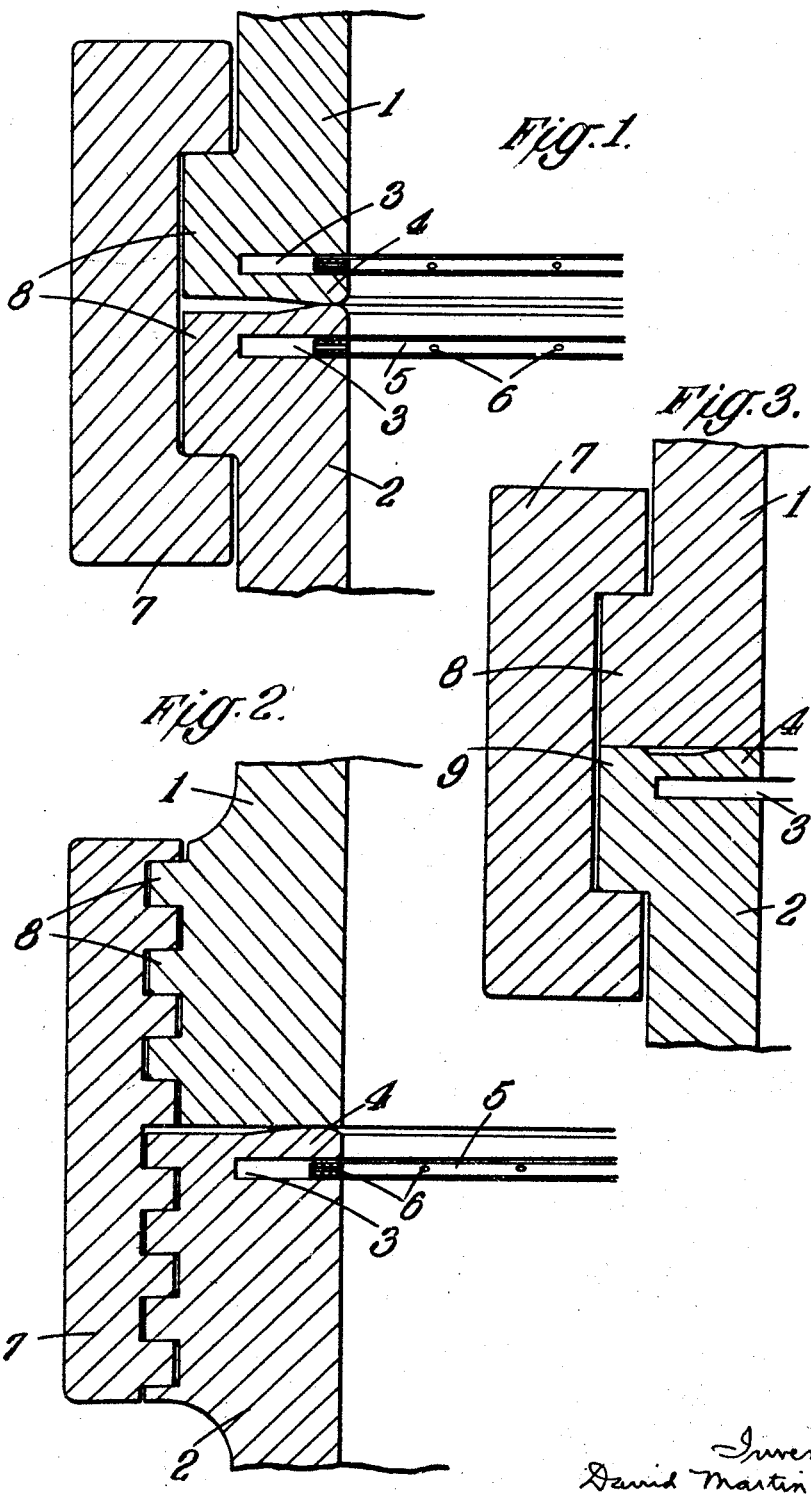

Patented May 17, 1932

1,859,065

UNITED STATES PATENT OFFICE

DAVID MARTIN ANDERSON, OF SHEFFIELD, ENGLAND, ASSIGNOR TO ENGLISH STEEL CORPORATION LIMITED, OF SHEFFIELD, ENGLAND, A BRITISH COMPANY

JOINT FOR PIPES OR VESSELS FOR CONTAINING FLUID UNDER PRESSURE

Application filed September 5, 1931, Serial No. 561,390, and in Great Britain December 24, 1930.

The present invention relates to joints for pipes or vessels adapted to contain fluid, liquid or gaseous, under considerable pressure, the joint being of the type wherein fluid-tightness is effected by the pressure of the fluid within the pipe or vessel. Hitherto it has been the practice to employ a separate ring adapted to make fluid-tight contact with each of the members to be connected and it is the object of the present invention to enable this ring to be dispensed with.

According to the invention, the fluid-tight joint is formed between the members to be connected themselves. For this purpose either or each of the members may be formed in proximity to its end with a portion which is slightly flexible and is acted upon by the internal pressure in such a manner as to maintain it in fluid-tight contact with the opposite member. In order that the internal pressure may have opportunity to build up and hold the joint-making surfaces in fluid-tight contact, these surfaces may be initially held lightly together by reason of the weight of one member on the other or by holding the members in juxtaposition in any suitable manner. Such action is not, however, according to the invention, relied on for the maintenance of a permanent fluid-tight joint.

In order that the invention may be clearly understood and readily carried into effect, it will now be described more fully with reference to the accompanying drawings, which illustrates, by way of example and in fragmentary longitudinal section, three forms of joint in accordance therewith.

Referring to Figure 1, in both of the lengths of piping or like members 1 and 2 to be connected there is formed an internal groove 3 sufficiently near to the end to provide beyond the groove a slightly flexible portion 4. The internal pressure has access to the groove 3 and consequently the portion 4 is pressed in the axial direction to make contact with the opposite member. As indicated, the end of the members 1 and 2 may be so shaped that the base of the flexible portion 4 near the bottom of the groove 3 is reduced in thickness in order to provide the necessary flexibility, any possibility of the material at this point being stressed beyond its elastic limit being obviated by the presence of the opposite member. Conversely, crushing of the flexible portion by pressure on the end of the member, due, for example, to the weight of the other member, may be prevented by the insertion in the mouth of the groove 3 of a distance piece 5 having apertures 6 through which the internal fluid pressure may gain access to the groove.

Separation of the members 1 and 2 due to the internal pressure may be prevented in any desired manner. For example, flanges formed on the members may be united by bolts and nuts, or external arc-shaped clamps, such as are described in the specification of co-pending English application No. 33721 of 1931, may be employed, such a clamp being indicated in Figure 1 at 7. If preferred, the surfaces of contact between the clamps 7 and the projections or flanges 8 on the pipes or like members 1 and 2, instead of being at right angles to the axes of the members, may be inclined so as to form conical surfaces, after the manner described in English patent specification No. 305,609, whereby, when the clamps are placed in position, the above-mentioned initial pressure required for lightly holding the flexible portions 4 together is provided.

In the modification depicted in Figure 2, a groove 3 is formed in one only of the members to be connected and the external clamp 7 is of the type adapted to engage threads or a series of flanges 8 on the members 1 and 2.

In the form of joint illustrated in Figure 3, instead of providing a distance piece to obviate crushing of the flexible portion 4, there is formed on the member 2 a raised facing 9 adapted to abut against the end of the member 1, the height of this facing being such as to permit slight bending of the flexible portion 4 without overstressing it. Obviously, in the case wherein a similar flexible portion is formed on the member 1, a corresponding raised facing may be provided thereon.

While in the above examples the groove 3 is shown as having its general direction at right angles to the axes of the pipes or like members, obviously it may be inclined thereto.

What I claim and desire to secure by Letters Patent of the United States is:—

1. Jointing means for pipes or vessels for containing fluid under pressure comprising in combination with one of the members to be connected of a flexible portion on said member in proximity to the end thereof and forced into contact with the opposite member by the internal fluid pressure, the member having the flexible portion being cut away adjacent the flexible portion to constitute a groove to which the fluid has access to enable the flexible portion to be forced more readily into contact with the opposite member, and the base of the flexible portion beyond the groove in proximity to the bottom thereof being reduced in thickness to increase its flexibility.

2. Jointing means for pipes or vessels for containing fluid under pressure comprising in combination with one of the members to be connected of a flexible portion on said member in proximity to the end thereof and forced into contact with the opposite member by the internal fluid pressure, the member having the flexible portion being cut away adjacent the flexible portion to constitute a groove to which the fluid has access to enable the flexible portion to be forced more readily into contact with the opposite member, and a distance piece located in the mouth of the groove and formed with apertures for the admission of the fluid.

3. Jointing means for pipes or vessels for containing fluid under pressure comprising in combination with one of the members to be connected of a flexible portion on said member in proximity to the end thereof and forced into contact with the opposite member by the internal fluid pressure, the member having the flexible portion being cut away adjacent the flexible portion to constitute a groove to which the fluid has access to enable the flexible portion to be forced more readily into contact with the opposite member, the base of the flexible portion beyond the groove in proximity to the bottom thereof being reduced in thickness to increase its flexibility, and a raised facing on the member having the flexible portion, said facing abutting the opposite member and preventing crushing of the flexible portion by the opposite member when in use.

4. Jointing means for pipes or vessels for containing fluid under pressure comprising in combination with the members to be connected, of a flexible portion on one of said members in proximity to the end thereof and forced into contact with the opposite member by the internal fluid pressure, projections on each of said members and securing means associated with said projections for holding the members together.

5. Jointing means for pipes or vessels for containing fluid under pressure comprising in combination with the members to be connected of a flexible portion on one of said members in proximity to the end thereof and forced into contact with the opposite member by the internal fluid pressure, projections on each of said members and external arc-shaped clamps embracing the said projections for holding the members together in their correct relative positions.

DAVID MARTIN ANDERSON.